United States Patent Office

2,802,847
Patented Aug. 13, 1957

2,802,847

BASIC ZIRCONYL SOAPS AND METHOD FOR PREPARING THE SAME

Warren B. Blumenthal, Niagara Falls, N. Y., assignor to National Lead Company, New York, N. Y., a corporation of New Jersey No Drawing. Application August 2, 1951, Serial No. 240,057

14 Claims. (Cl. 260—414)

This invention relates to zirconium soaps and to methods of their preparation. It relates more particularly to basic zirconyl soaps of aliphatic monocarboxylic acids of the general formula $Zr_2O_3(OOCR)_2$ where R is an aliphatic organic radical of four or more carbon atoms.

Heretofore, several methods have been suggested for preparing zirconium soaps but none of these yielded the basic zirconyl soaps, nor were they intended to do so. These prior art methods fell generally into two categories: (1) those based upon the reaction between zirconium halides and fatty acids, and; (2) those based upon the reaction between aqueous solutions of certain zirconium salts and aqueous solutions of alkali metal soaps. Both yielded the normal zirconium soaps or normal zirconyl soaps but not the basic soaps. In these methods, the control of quality and uniformity was poorly developed and soaps prepared by the first method were apt to contain corrosive halogen acid while those prepared by the second method were apt to contain several different varieties of soap due to the coexistence of several varieties of zirconium ions in the zirconium salt solutions used in preparing the soaps. By means of the present invention, heretofore unknown basic zirconyl soaps having a high degree of uniformity and purity can be produced.

An object of the present invention is the preparation of basic zirconyl soaps of a high degree of purity and uniformity. This and other objects of the present invention will become apparent from the following description.

In its broadest aspect the invention contemplates forming an aqueous solution of basic zirconyl halide, reacting this solution with an alkali soap of a monocarboxylic aliphatic acid in aqueous solution, separating and recovering the basic zirconyl soap precipitated from the mixed solutions. As used herein the term "alkali soap" includes the ammonium soap as well as soaps of the alkali metals.

In forming the basic zirconyl halide solution, a water-soluble zirconyl halide, preferably zirconyl chloride ($ZrOCl_2.8H_2O$) is dissolved in water. To this solution is added a carbonate of an alkali metal, preferably soda ash, $Na_2CO_3$, or of ammonia, until about one-half of the acidity is neutralized, i. e. until a pH of about 2.4 to 2.6 is obtained.

The solution of alkali metal soap is separately prepared in any suitable or convenient manner. A preferred procedure is to add the aliphatic acid to water at an elevated temperature and to this mixture add a strong solution of caustic alkali, while maintaining the whole at an elevated temperature to insure complete saponification until a slightly alkaline pH is attained, i. e. about pH=7.9 to 8.1. The temperature is not critical but a convenient range is from about 85°–95° C. The strength of the caustic alkali is also not critical but should be sufficiently strong to avoid handling more water than is necessary. A strength of between about 40% and 60% is quite satisfactory.

When the two solutions have been prepared, the basic zirconyl halide solution is added to the soap solution while stirring sufficiently rapidly to avoid local excess acidity which will tend to decompose the zirconyl soap. A good, practical rate of addition is from about ten minutes to one hour. During the mixing the temperature is kept elevated, preferably between 90° and 95° C. At lower temperatures the reaction is frequently incomplete while at higher temperatures frothing tends to be excessive. When all the zirconyl halide solution is added, the pH should be between about pH=6.0 and 7.0, and the amount of zirconyl solution employed should be such as to produce a final pH within the range. When the mixing is complete, the basic zirconyl soap has been precipitated and the whole is in the form of a slurry. This is stirred for a few minutes to insure completeness of reaction, filtered and washed substantially free of halides. The filter cake is then dried, if desired, at an elevated temperature.

The resulting product, the basic zirconyl soap is recovered as a soft white solid which has a composition corresponding to the formula $Zr_2O_3(OOCR)_2$ where R is an aliphatic organic radical of four or more carbon atoms. In the event that the product is found to contain a small amount of free fatty acid, this can be removed by washing or leaching with alcohol.

In order that the invention may be more fully understood, the following example specific to the preparation of basic zirconyl stearate is given for purpose of illustration:

Example I 1138 grams of stearic acid was added to 8 liters of water at 90° C. While holding the temperature at 90° C. a 50% solution of caustic soda was added slowly until a permanent pH of between 7.9 and 8.1 was attained. In another vessel 1246 grams of zirconyl chloride ($ZrOCl_2.8H_2O$) was dissolved in water and diluted to a volume of 10 liters at 25° C. Under agitation, 208 grams of soda ash dissolved in 1100 ml. of water was added slowly until a pH of between 2.4 and 2.6 was reached. This solution was then added to the sodium stearate solution at a rate of 1 liter per minute, under agitation and while maintaining the latter solution at a temperature between 90° and 95° C. When all the zirconyl salt solution had been added the solution had a pH between 6.0 and 7.0. The resulting slurry consisting of precipitated basic zirconyl stearate and supernatant liquor was stirred for about 10 minutes; it was then filtered and the filter cake washed with water until the effluent was substantially free of chlorides. The filter cake was dried at 85° C.

The product was found to be a soft, white solid consisting of basic zirconyl stearate, $Zr_2O_3(OOCC_{17}H_{35})_2$.

Example II

The same procedure was followed for this example as for Example I, except that for the 1138 grams of stearic acid, 1130 grams of oleic acid was substituted. The product obtained was basic zirconyl oleate.

Example III

The same procedure was followed for this example as for Example II, except that for the 1138 grams of stearic acid, 577 grams of alpha-ethyl caproic acid was substituted. The product obtained was basic zirconyl alpha-ethyl caproate.

It has been found that the present invention as illustrated in the foregoing examples is applicable to the preparation of other basic zirconyl soaps of monocarboxylic aliphatic acids, whether saturated or unsaturated and whether or not containing substituents. In preparing such other soaps, the quantities of the reactants employed will vary according to their reacting weights. Thus there have been prepared according to the invention basic zirconyl soaps of palmitic, caprylic, capric, caproic and other fatty acids having four or more carbon atoms.

In the practice of the invention another water-soluble halide other than the chloride, e. g. the bromide, may be substituted for the zirconyl chloride. Caustic potash or ammonia may be substituted for the caustic soda, and ammonium or potassium carbonate for the soda ash.

Basic zirconyl soaps prepared according to the present invention have a high degree of purity and uniformity and are useful as modifiers of lubricants in which they impart increased viscosity, water-repellant agents for surfacing textiles, paper, leather, etc., and as additions to soothing creams for application to the skin.

While this invention has been described and illustrated by the embodiments shown, it is not intended to be strictly limited thereto and other modifications and variations may be employed within the scope of the following claims.

I claim:

1. Method for the preparation of zirconium soaps which comprises dissolving a water-soluble zirconyl halide in water, adding thereto sufficient of a carbonate selected from the group consisting of ammonium carbonate and the carbonates of the alkali metals to neutralize about one-half of the acidity of the zirconyl halide solution, separately forming an aqueous solution of an alkali soap of a monocarboxylic aliphatic acid having at least four carbon atoms other than the carboxyl carbon, mixing the two solutions, separating and recovering the basic zirconyl soap precipitated from the mixed solutions.

2. Method for the preparation of zirconium soaps which comprises dissolving a water-soluble zirconyl halide in water, adding thereto sufficient of a carbonate selected from the group consisting of ammonium carbonate and the carbonates of the alkali metals to neutralize about one-half of the acidity of the zirconyl halide solution, separately forming an aqueous solution of an alkali soap of a monocarboxylic aliphatic acid having at least four carbon atoms other than the carboxyl carbon, with a concentrated solution of caustic soda, adding sufficient of the zirconyl halide solution to the sodium monocarboxylate solution to obtain a pH between about 6.0 and 7.0, separating and recovering the basic zirconyl monocarboxylate precipitated from the mixed solutions.

3. Method according to claim 2 wherein the zirconyl halide used is zirconyl chloride ($ZrOCl_2.8H_2O$).

4. Method according to claim 2, wherein the alkali soap used is a sodium soap.

5. Method according to claim 2, wherein the alkali soap used is a potassium soap.

6. Method according to claim 2, wherein the alkali soap used is an ammonium soap.

7. Method according to claim 2 wherein the carboxylic acid used is stearic acid.

8. Method according to claim 2, wherein the carboxylic acid used is oleic acid.

9. Method according to claim 8, wherein the carboxylic acid used is alpha-ethyl-caproic acid.

10. Method for the preparation of zirconium soaps which comprises dissolving zirconyl chloride in water, adding thereto sufficient sodium carbonate solution to obtain a pH between about 2.4 and 2.6, separately forming an aqueous solution of sodium stearate by reacting stearic acid with a concentrated solution of caustic soda, adding sufficient of the basic zirconyl chloride solution to the sodium stearate solution to obtain a pH between about 6.0 and 7.0, separating and recovering the basic zirconyl stearate precipitated from the mixed solutions.

11. As a new composition of matter, basic zirconyl soap corresponding to the formula, $Zr_2O_3(OOCR)_2$ where R is an aliphatic organic radical of at least four carbon atoms.

12. As a new composition of matter, basic zirconyl stearate corresponding to the formula, $$Zr_2O_3(OOCC_{17}H_{35})_2$$

13. As a new composition of matter, basic zirconyl oleate corresponding to the formula, $$Zr_2O_3(OOCC_{17}H_{33})_2$$

14. As a new composition of matter, basic zirconyl ethyl caproate corresponding to the formula $$Zr_2O_3(OOCC_7H_{15})_2$$

References Cited in the file of this patent

UNITED STATES PATENTS

| | | |
|---|---|---|
| 2,221,975 | Kinzie et al. | Nov. 19, 1940 |
| 2,482,816 | Van Mater | Sept. 27, 1949 |

FOREIGN PATENTS

| | | |
|---|---|---|
| 624,120 | Great Britain | May 27, 1949 |